(12) United States Patent
Guleryuz et al.

(10) Patent No.: US 6,927,780 B2
(45) Date of Patent: Aug. 9, 2005

(54) FAST TEXT/GRAPHICS RESOLUTION IMPROVEMENT WITH CHAIN-CODE TABLE LOOK-UP

(75) Inventors: Onur G. Guleryuz, Sunnyvale, CA (US); Anoop K. Bhattacharjya, Campbell, CA (US)

(73) Assignee: Seiko Epson Corporation, Tokyo (JP)

( * ) Notice: Subject to any disclaimer, the term of this patent is extended or adjusted under 35 U.S.C. 154(b) by 181 days.

(21) Appl. No.: 10/047,326

(22) Filed: Jan. 14, 2002

(65) Prior Publication Data

US 2003/0132943 A1 Jul. 17, 2003

(51) Int. Cl.⁷ .............................................. G09G 5/00
(52) U.S. Cl. ................... 345/611; 345/581; 345/613; 345/601
(58) Field of Search ..................... 345/581, 601–602, 345/611–614, 698; 382/266, 269, 299, 242

(56) References Cited

U.S. PATENT DOCUMENTS

| | | | |
|---|---|---|---|
| 4,528,693 A | * 7/1985 | Pearson et al. | ............. 382/299 |
| 4,777,651 A | * 10/1988 | McCann et al. | ............. 382/242 |
| 5,270,836 A | 12/1993 | Kang | |
| 5,355,421 A | * 10/1994 | Koyama | ............. 382/266 |
| 5,387,985 A | 2/1995 | Loce et al. | |
| 5,404,411 A | 4/1995 | Banton et al. | |
| 5,448,692 A | * 9/1995 | Ohta | ............. 715/520 |
| 5,537,495 A | * 7/1996 | Overton | ............. 382/269 |
| 5,539,866 A | 7/1996 | Banton et al. | |
| 5,579,445 A | 11/1996 | Loce et al. | |
| 5,600,772 A | * 2/1997 | Zhou et al. | ............. 345/170 |
| 5,875,268 A | 2/1999 | Miyake | |
| 5,982,386 A | * 11/1999 | Fujimoto | ............. 345/443 |
| 6,021,256 A | 2/2000 | Ng et al. | |
| 6,052,489 A | * 4/2000 | Sakaue | ............. 382/266 |
| 6,058,248 A | 5/2000 | Atkins et al. | |
| 6,208,765 B1 | 3/2001 | Bergen | |
| 6,226,420 B1 | 5/2001 | Hamill | |
| 6,473,525 B1 | * 10/2002 | Cheung et al. | ............. 382/199 |

* cited by examiner

Primary Examiner—Matthew C. Bella
Assistant Examiner—Po-Wei Chen
(74) Attorney, Agent, or Firm—Michael T. Gabrik

(57) ABSTRACT

A fast text/graphics resolution improvement algorithm is based on boundary parameterization and uses chain-code table look-up. Given an input representation containing text/graphics objects, the boundary of each object is traced, parameterized, smoothed, and subsequently rendered. Instructions for the critical operations are stored in one or more pre-computed look-up tables (LUTs) which is/are accessed during on-line operation, resulting in an algorithm that is fast and computationally inexpensive with low memory requirements. A very flexible framework is presented which can be utilized in a variety of applications requiring resolution improvement.

21 Claims, 6 Drawing Sheets

Current pixel    Traced boundary    Boundary coordinates

Upsampled boundary coordinates

FAST TEXT/GRAPHICS RESOLUTION IMPROVEMENT WITH CHAIN-CODE TABLE LOOK-UP

BACKGROUND OF THE INVENTION

1. Field of the Invention

This present invention relates to a technique for improving text/graphics resolution based on boundary parameterization which may advantageously employ a look-up table (LUT) addressed by a chain-code to achieve fast, high-quality rendering on laser printers and other print/display media. The technique may be embodied in software, hardware or combination thereof and may be implemented on a computer or other processor-controlled device. The invention also relates to the structure and construction of a chain-code-addressable LUT for use with the resolution-improving technique.

2. Description of the Related Art

Frequently, a digital representation composed of text and/or graphics that has been generated at a low resolution has to be rendered at a much higher resolution offered by printers and other high resolution devices. For example, such a text/graphics digital representation when displayed on a computer screen is rendered at the resolution of the screen, which is usually much lower than that of a printer. Screen resolution is typically about 70 dots per inch (dpi), whereas a printer typically has a resolution of 300, 600 or 1200 dpi. Thus, in order to produce the digital representation on the printer or other high resolution device it is necessary to perform a resolution conversion when the representation is sent to such device.

There are various techniques for performing the resolution conversion. With one technique, which utilizes scalable fonts, text information is sent to the printer in terms of angles, enabling the printer to increase the resolution. However, even with this technique, the printer is usually not able to print at its highest resolution, since the fonts are scaled up in dpi resolution, but a printer has an even higher resolution than its smallest dot. A single dot may itself be divisible into multiple sections. Other techniques are available which preserve or improve quality during the resolution conversion, but these techniques are slower, more complex and/or more memory intensive than is desirable.

OBJECTS AND SUMMARY OF THE INVENTION

1. Objects of the Invention

It is therefore an object of the present invention to overcome the above-mentioned problems.

It is another object of this invention to provide a memory and computationally efficient, look-up-table-based technique for improving text and graphics resolution for high quality rendering on high resolution devices.

It is yet another object of this invention to provide such a look-up-table based technique, wherein the look-up table (LUT) is directly addressed using a chain-code.

2. Summary of the Invention

According to one aspect of this invention, a method for improving resolution of a digital representation having a plurality of text or graphics pixels is provided. The method comprises the steps of: identifying a text or graphics pixel on a boundary of a text or graphics object of the digital representation; and for each text or graphics pixel identified as on the boundary tracing a group of pixels, including the initial boundary-identified pixel, that constitute a local boundary segment and constructing an identifier for that local boundary segment; parameterizing and smoothing that local boundary segment, resulting in a new local boundary segment, by computing instructions for parameterizing and smoothing that local boundary segment; and rendering the parameterized and smoothed boundary segment to improve the resolution of the text or graphics object.

In preferred embodiments of this aspect of the invention, the instructions are pre-computed, stored in a look-up table, indexed by the corresponding identifier, and directly accessed during the parameterizing and smoothing of that local boundary segment. Moreover, the constructing of the identifier is preferably based on the relative locations of the pixels in the group that constitute the corresponding local boundary segment.

Further aspects of the tracing step may comprise identifying first and second contiguous sub-groups of pixels, each starting with the initial pixel and extending in first and second directions respectively relative to a known background pixel and, if available, a just-identified pixel in that sub-group, and wherein the identifier assigned to the corresponding local boundary segment is a chain-code constructed based on the tracing step. The tracing step may alternatively entail identifying each pixel in the group, starting from the initial pixel in the group and tracing N pixels in a first direction and N pixels in a second direction, and wherein the identifier assigned to the corresponding local boundary segment is a chain-code constructed based on a pre-determined set of rules used in the tracing step.

In some embodiments, the stored instructions on parameterizing and smoothing comprise a differential stored at a location in the pre-computed look-up table indexed by the corresponding identifier, the differential representing a difference between the location of at least one pixel in the new local boundary segment and the location of that pixel in the corresponding un-parameterized and un-smoothed local boundary segment.

In other embodiments, the stored instructions on parameterizing and smoothing comprise general occupancy information stored at a location in the pre-computed look-up table indexed by the corresponding identifier, the general occupancy information representing a difference between the location of the new local boundary segment and the location of the corresponding un-parameterized and un-smoothed local boundary segment.

The method is preferably carried out for each text and graphics pixel on a boundary of a text or graphics object of the digital representation; that is, each such pixel is identified, and the tracing, parameterizing and smoothing, and rendering is carried out for each so-identified pixel.

In another aspect, the invention involves an apparatus for improving resolution of a digital representation having a plurality of text or graphics pixels. The apparatus comprises: means for identifying a text or graphics pixel on a boundary of a text or graphics object of the digital representation; and means for tracing a group of pixels, including an initial boundary-identified pixel, that constitute a local boundary segment and constructing an identifier for that local boundary segment; means for parameterizing and smoothing that local boundary segment to generate a new local boundary segment by computing instructions for parameterizing and smoothing that local boundary segment; and means for rendering the parameterized and smoothed boundary segment to improve the resolution of the text or graphics object.

The apparatus preferably comprises a look-up table for storing the instructions, which are pre-computed, such that the instructions are indexed in the look-up table by the corresponding identifier, wherein the look-up table is directly accessible by the parameterizing and smoothing means. Also, the identifier is preferably based on the relative locations of the pixels in the group that constitute the corresponding local boundary segment.

The tracing means may be configured to identify first and second contiguous sub-groups of pixels, each starting with the initial pixel and extending in first and second directions respectively relative to a known background pixel and, if available, a just-identified pixel in that sub-group, wherein the identifier assigned to the corresponding local boundary segment is a chain-code constructed based on the tracing performed by the tracing means. Alternatively, the tracing means may be configured to identify each pixel in the group, starting from the initial pixel in the group and tracing N pixels in a first direction and N pixels in a second direction, wherein the identifier assigned to the corresponding local boundary segment is a chain-code constructed based on a pre-determined set of rules used in the tracing step.

In some embodiments, the stored instructions on parameterizing and smoothing comprise a differential stored at a location in the pre-computed look-up table indexed by the corresponding identifier, the differential representing a difference between the location of at least one pixel in the new local boundary segment and the location of that pixel in the corresponding un-parameterized and un-smoothed local boundary segment.

In other embodiments, the stored instructions on parameterizing and smoothing comprise general occupancy information stored at a location in the pre-computed look-up table indexed by the corresponding identifier, the general occupancy information representing a difference between the location of the new local boundary segment and the location of the corresponding un-parameterized and un-smoothed local boundary segment.

Preferably, the identifying means is configured to identify each text and graphics pixel on a boundary of a text or graphics object of the digital representation, wherein the tracing, parameterizing and smoothing, and rendering means are each configured to operate on each boundary-identified pixel.

In accordance with further aspects of the invention, any of the above-described methods or steps thereof may be embodied in a program of instructions (e.g., software) which may be stored on, or conveyed to, a computer or other processor-controlled device for execution. Alternatively, any of the methods or steps thereof may be implemented using functionally equivalent hardware (e.g., application specific integrated circuit (ASIC), digital signal processing circuitry, etc.) or a combination of software and hardware.

Other aspects of the invention include a method for constructing a chain-code-addressable look-up table for use with an algorithm for improving resolution of a digital representation and such a look-up table itself. The method comprises the steps of: tracing a plurality of M-pixel-length segments that may be encountered on a boundary of a text or graphics object in such a digital representation, where M is an integer greater than or equal to 3; constructing a chain-code identifying each M-pixel-length pixel segment during the tracing of that segment, each chain-code being an index to the look-up table; and developing instructions for smoothing each M-pixel-length segment and storing the instructions for each segment with its chain-code in the look-up table. Preferably, M is 7 or 9.

Preferably, for each M-pixel-length segment traced, the correspondingly constructed chain-code identifies first and second contiguous sub-groups of pixels, each starting with a current pixel and extending in first and second directions respectively relative to a known background pixel and, if available, a just-identified pixel in that sub-group.

In some embodiments, the developed instructions comprises a plurality of computed differentials, each representing a difference between the location of at least one pixel in a respective one of the smoothed M-pixel-length segments and the location of that pixel in the corresponding un-smoothed M-pixel-length segment.

In other embodiments, the developed instructions comprises a plurality of computed general occupancy information sets, each representing a difference between the location of a respective one of the smoothed M-pixel-length segments and the location of the corresponding un-smoothed M-pixel-length segment.

The chain-code-addressable look-up table itself comprises: a plurality of chain-codes, each identifying a distinct multiple pixel segment that may be encountered on a boundary of a text or graphics object, each chain-code being an index to the look-up table; and a plurality of sets of general occupancy information, one set for each multiple pixel segment, each set being located at an address in the look-up table to which the chain-code of the corresponding multiple pixel boundary segment is indexed, and each set of general occupancy information providing instructions for smoothing the corresponding multiple pixel boundary segment.

In some embodiments, the plurality of sets of general occupancy information comprises differentials, one for each multiple pixel segment, each differential being located at an address in the look-up table to which the chain-code of the corresponding multiple pixel boundary segment is indexed, and each differential providing instructions for smoothing the corresponding multiple pixel boundary segment. In this case, each differential preferably represents a difference between the location of at least one pixel in a smoothed multiple pixel boundary segment and the location of that pixel in an un-smoothed multiple pixel boundary segment.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

A. Overview

The look-up-table-based resolution improvement algorithm of the present invention effectively operates on digital text/graphics rendered at a particular resolution to produce the same text/graphics at a higher resolution with better quality. The algorithm of this invention has the speed as well as the memory and computational efficiency to cope with the data sizes and throughput required for high resolution printing.

Figure 1:
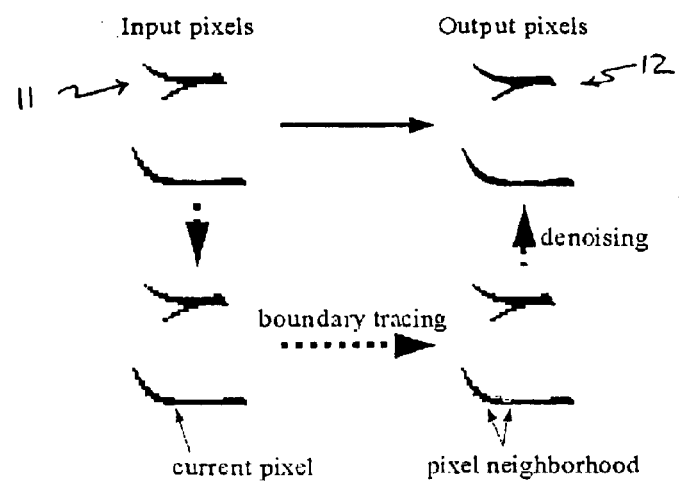
FIG. 1 is illustrates an overview of the resolution improvement technology (RIT) algorithm of the present invention.

FIG. 1 is a conceptual overview of the resolution improvement technology algorithm (RIT) of the present invention. As shown, the RIT algorithm is able to convert the low resolution character depicted by the input pixels 11 of the input representation into a high resolution one depicted by the output pixels 12 of the output representation. This conversion is accomplished by applying the algorithm to each text and graphics pixel in the input representation. In that regard, it should be noted that prior to invoking the algorithm the text and graphics pixels should be labeled as such using a suitable known labeling method. The RIT algorithm of the present invention is then applied to smooth the "jagged" boundaries of the low resolution text/graphics objects. For each text/graphics pixel that is on the boundary of a text/graphics object, the algorithm generally comprises determining a group of pixels that make up a local boundary segment, parameterizing and smoothing the local boundary segment, and rendering the smoothed boundary segment. The final result is an output representation with resolution improved text/graphics objects.

Figure 2:
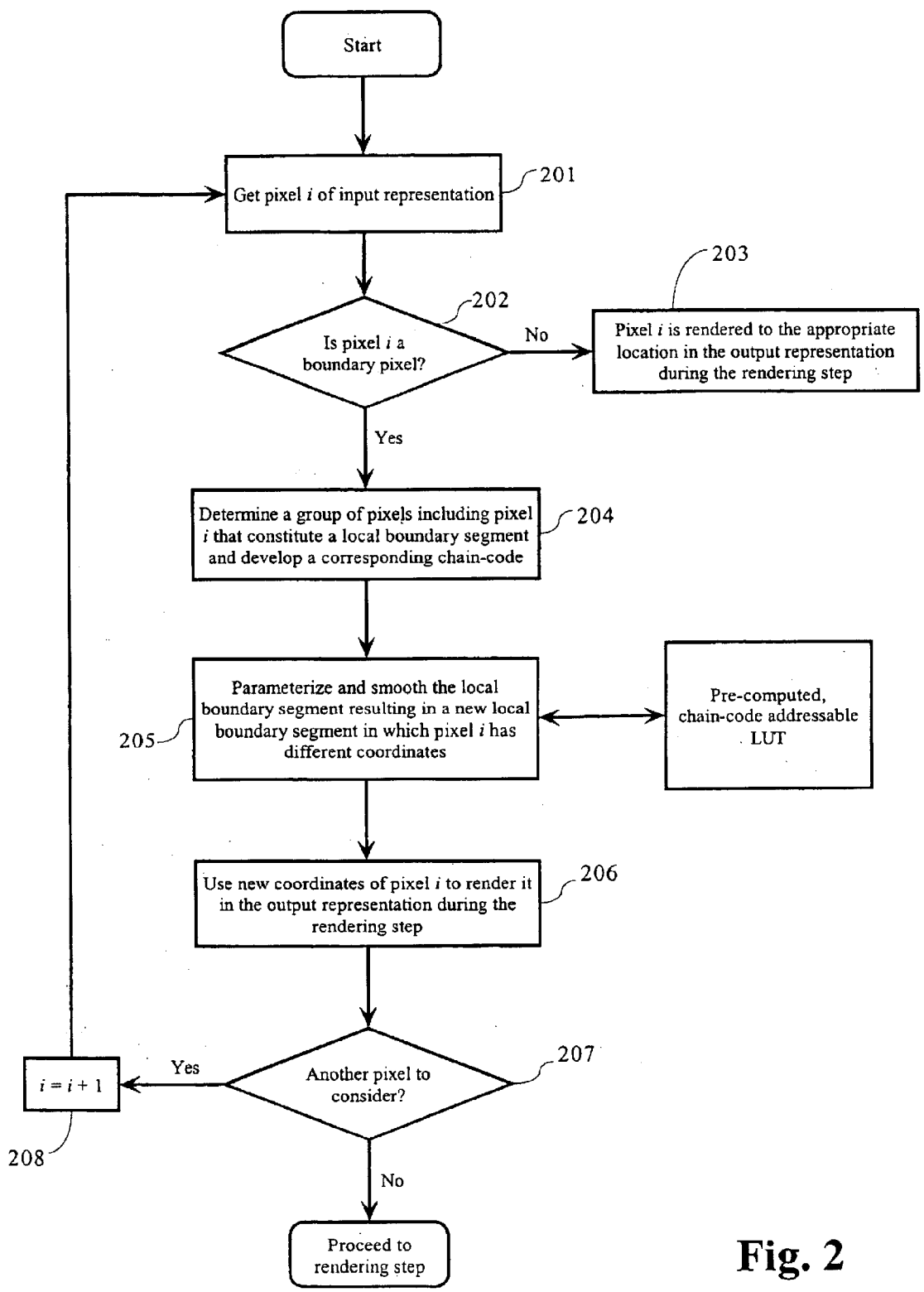
FIG. 2 is a flow diagram generally illustrating the overall process of the RIT algorithm.

FIG. 2 is a flow chart generally illustrating the process. In step 201, a current pixel (pixel i) is retrieved. Pixel i is first checked to determine if it is part of a boundary of a text/graphics object (step 202). A pixel is considered to be such a boundary pixel if at least one of its 4-connected (or 8-connected if desired) pixel neighbors does not belong to a text/graphics object. If not, the current pixel is deemed to be a non-boundary pixel and is rendered to the appropriate location in the output during rendering step (step 203). If so, in step 204 the current pixel is part of the boundary of that text/graphics object, in which case a local neighborhood of pixels that make up the local boundary segment is determined. That is, a boundary is traced and a chain-code is developed which identifies the boundary and which is used for addressing the pre-computed LUT. Using the boundary's chain-code, the LUT is addressed, corresponding information stored therein is obtained, and the boundary segment is parameterized and smoothed (or de-noised) in step 205, resulting in a new segment in which the pixels, in particular the current pixel, have different coordinates than their counterpart "old" pixels. The new coordinates for the current pixel are then used to render the current pixel in the output representation during the rendering step (step 206). One way to visualize this is to consider the boundaries of text and graphics objects as jagged rubber bands in the low resolution. Those bands are then smoothed (extended and/or contracted as necessary) to reshape the boundary and hence form a new object in the output. If there is an additional pixel in the input representation to consider, as determined in step 207, the pixel identifier i is incremented in step 208, and the process returns to step 201.

Advantageously, all of the computationally complex operations of the algorithm are carried out using one or more pre-computed LUTs for fast and computationally simple operation. Moreover, memory requirements for the algorithm can be precisely controlled by adjusting the size of the pixel neighborhood in the construction of the boundary segment.

The details of the algorithm including boundary tracing, boundary resolution improvement, and rendering are described below.

B. Main Algorithm

B. 1. Boundary Tracing

Figure 3:
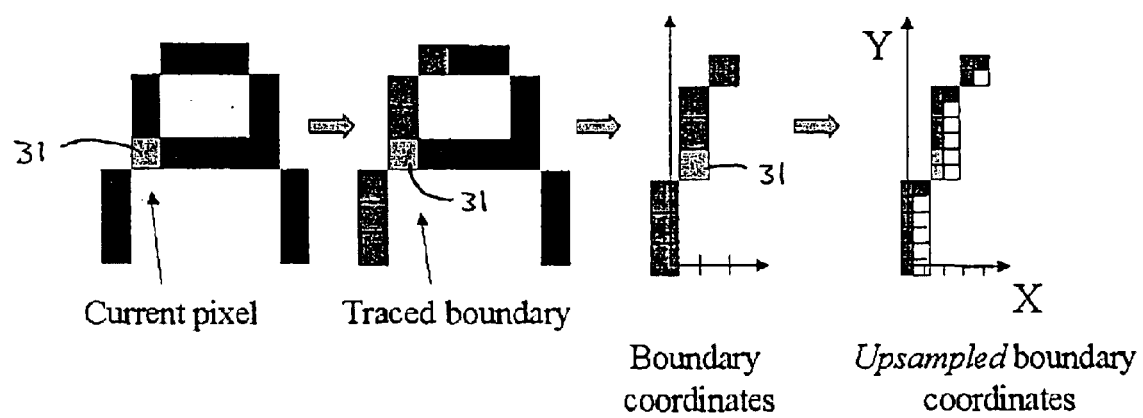
FIG. 3 illustrates details boundary tracing step of the RIT algorithm.

FIG. 3 outlines the boundary tracing operation carried out by the RIT algorithm of this invention. Given the current pixel 31 identified in FIG. 3, a group or neighborhood of pixels that constitute a local boundary segment, identified in the figure as the traced boundary, of the text object shown. Observe that there can be more than one boundary segment associated with a given pixel. For, example, using 4-connectivity, the current pixel in FIG. 3 has a non-text neighbor pixel to its left and another below. The illustrated boundary segment is "associated with" the non-text pixel to the left, while the other boundary segment associated with the non-text pixel below is not shown. Subject to certain restrictions discussed below, the RIT algorithm of the present invention considers multiple boundaries, preferably by considering them one after another.

Due to memory considerations, the boundary segment determination is restricted to avoid excessive buffering of input data. Thus, the algorithm does not allow an arbitrarily large number of pixels to belong to a boundary segment, even if a particularly long boundary on an object, say a long line or curve on a graphics object, is encountered. In a preferred embodiment, the algorithm restricts the number of pixels that are traced to form the local boundary segment to 2N+1, meaning that in addition to the current pixel, N pixels are traced on "each side". In the illustrated embodiment (see FIG. 4(d)), N is 4. There may instances where it may not be possible to trace a boundary of length 2N+1 pixels, perhaps due to small features in the input data. In such cases, the algorithm simply extrapolates the short boundary it has traced to form a longer boundary of 2N+1 pixels. The extrapolation may be done by any of several ways known to those skilled in the art. A restriction of 2N+1 pixels is merely one example of a reasonable restriction; any other alternative pixel length/number restriction may be imposed instead, bearing in mind that LUT size is proportional to $P^{(2N+1)}$ where P is the number of directions considered at each juncture of the trace.

In addition to restricting the length of potential boundaries to maintain low memory overhead, the algorithm also takes speed into consideration. For example, it is very likely that the traced boundary segment shown in FIG. 3 will be encountered again wherever that same text/graphics pattern is repeated in the input data. While tracing itself is not computationally demanding, as will be seen in the next sub-section, smoothing of the boundary is best handled by sophisticated signal processing algorithms with relatively high computational requirements. It is thus computationally wasteful to smooth a boundary segment multiple times on a given input representation. Furthermore, it is often desirable to keep necessary computations to a minimum. To this end, the algorithm of this invention advantageously considers all possible boundary segments and computes the desired outputs for each one of such boundary segments. These outputs are used to construct a LUT where the results of needed computations for smoothing are stored for each one of the possible boundary segments. The LUT is computed once off-line and is stored for direct access by the algorithm during regular operation. During regular operation, the algorithm traces the boundary, uses the result of the trace (i.e., the chain-code developed for that trace) to access the proper location in the LUT, and reads the results of needed computations for smoothing from this location in the LUT. In this fashion, computationally demanding operations for smoothing are completely avoided and boundary segments located in the input representation can be processed more quickly and efficiently.

In order to confine the LUT to a reasonable size it is important that the boundary length/pixel number restriction (e.g., 2N+1) be such that the number of possible boundaries is not too large. Since any non-edge, text/graphics pixel on a boundary has eight nearest neighbors with at least one such neighbor being a non-text/graphics pixel, it follows that the next pixel on that boundary can be one of eight minus the number of neighboring non-text/graphics pixels (one of seven when there is only one neighboring non-text/graphics pixel). Thus, there is an upper bound on the number of boundary segments which is exponential with respect to the length. However, the exact number can be difficult to compute (especially for significantly intertwined boundaries that restrict the number of candidate neighbors to much less than seven) for particular pixels on the boundary segment. Thus, the algorithm of this invention generates LUT indices from boundary segments in a uniform way so that unnecessary computations are avoided and access to the look-up table is easy. This is accomplished using a chain-code table look-up approach explained below.

The algorithm of the present invention traces a boundary segment by constructing a chain-code that serves as an index to the LUT. As discussed above, given a pixel on the boundary segment, the "next" pixel on the boundary segment can be found in one of seven directions, in the worst case. The algorithm of this invention restricts the direction possibilities by forcing the trace to progress in only a subset of these directions. That is, instead of having seven directions in the worst case, the algorithm considers only P<7 directions at each juncture of the trace. This not only puts a limit on the computations required for the boundary segment trace but also serves to limit the memory requirements for the LUT, as the total number of possible boundaries becomes less than or equal to $P^{(2N+1)}$.

Figure 4:
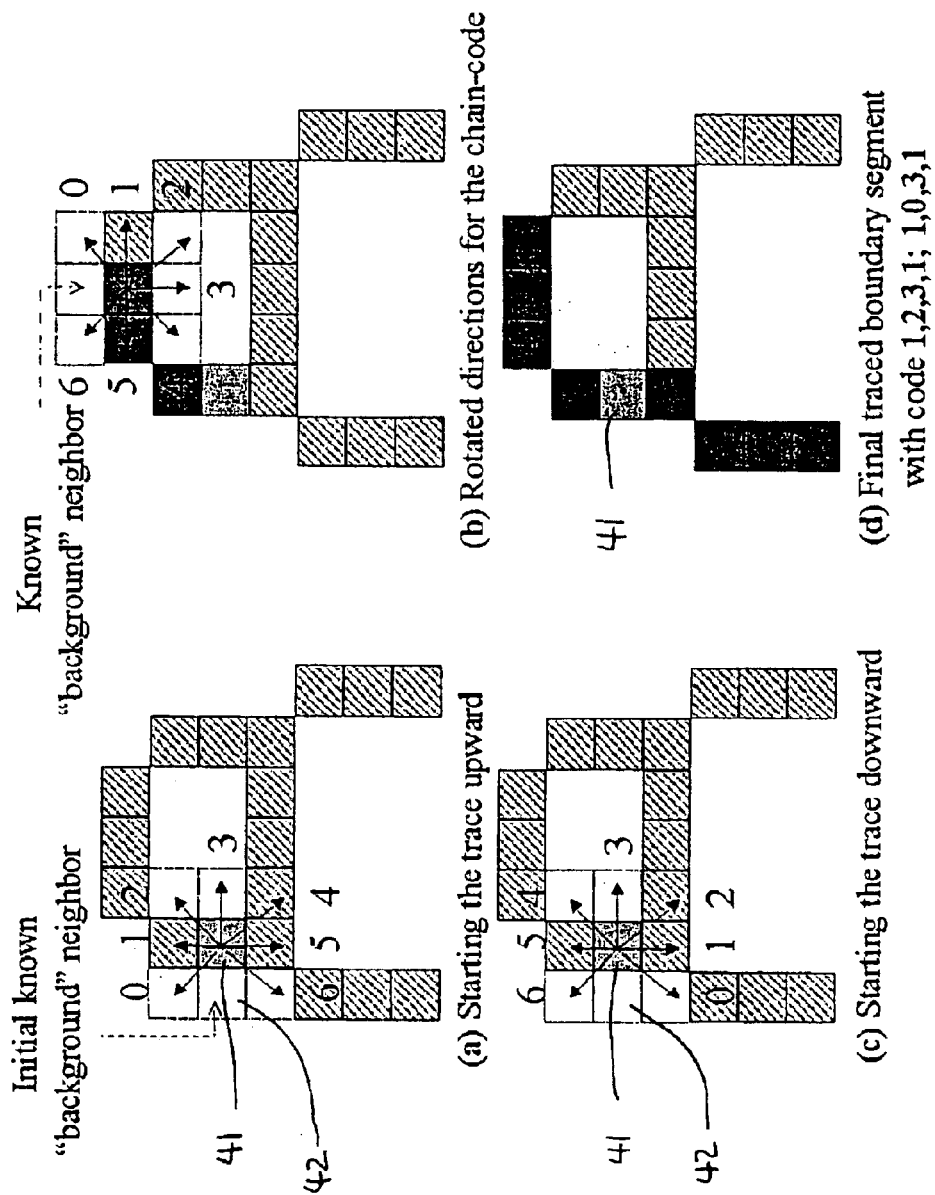
FIGS. 4(a), (b), (c) and (d) collectively illustrate details of an exemplary boundary trace.

FIG. 4 illustrates an example trace of a boundary segment. As shown in FIGS. 4(a) and 4(c), the current pixel 41 serves as the initial starting point from which tracing starts in two directions, each extending N pixels to produce a 2N+1 pixel boundary segment. As mentioned previously, if N pixels are not available in either direction, then the algorithm extrapolates additional points in order to provide uniform access to the LUT. As shown in FIG. 4(a), the initial pixel 41 has one or more non-text/graphics neighbor pixels referred to as "background" neighbors. (Any non-text/graphics pixel is a background pixel.) As previously noted, each of these background neighbors can be associated with a different boundary segment. For example, in FIG. 4(a), using 4-connectivity, there are two such neighbors. The left background neighbor is associated with the boundary segment making up the leftmost portion of the letter (as shown traced in FIG. 4(d)) and the right background neighbor is associated with the boundary segment in the closed area of the letter (not shown). Given this initial pixel and, say, the left background neighbor 42, there can be seven directions which are searched in turn to decide the next pixel in the segment. The first text/graphics pixel in the respective direction is determined as the next pixel on the boundary segment, and the algorithm continues the trace from this next pixel until N pixels are found in that direction. Observe that the order of the search is with respect to the background neighbor and that the background neighbor is propagated from pixel to pixel during the trace. For example, as shown in FIG. 4(a), if direction 1 is taken from the current pixel to the next pixel, the background neighbor will remain to the left of that next pixel for purposes of the orientation of the numeric directional indicators. Thus, the orientation and hence the order of the boundary search will remain the same, that is, the upper-left diagonal (0) direction will be searched first at the next iteration.

However, depending on the traced boundary segment, this order may change, as shown in FIG. 4(b). In that figure, the current pixel from where the search is to continue is the upper middle pixel, and the known background neighbor is immediately above it. Therefore, since the search order is with respect to the background neighbor, the upper-right diagonal direction will be the initial direction searched. Associating the directional order of the search with the background neighbor allows the use of locally relative directions which become important when the number of directions to search is constrained to be a number P<7. As illustrated in FIG. 4(b), the search order (or directional orientation) "rotates" during the trace, and further the illustrated boundary can actually be traced using only four distinct but relative directions. There will be instances where a constrained number P of directions will not be sufficient to determine N points during either portion of the trace. In such cases, the algorithm of this invention will again provide an extrapolation.

FIG. 4(d) shows a final traced boundary segment of nine pixels, including the initial boundary pixel 41 and four pixels in each traced direction. The chain-code for this traced boundary segment is 1, 2, 3, 1; 1, 0, 3, 1.

B. 2. Boundary Resolution Improvement

Figure 5:
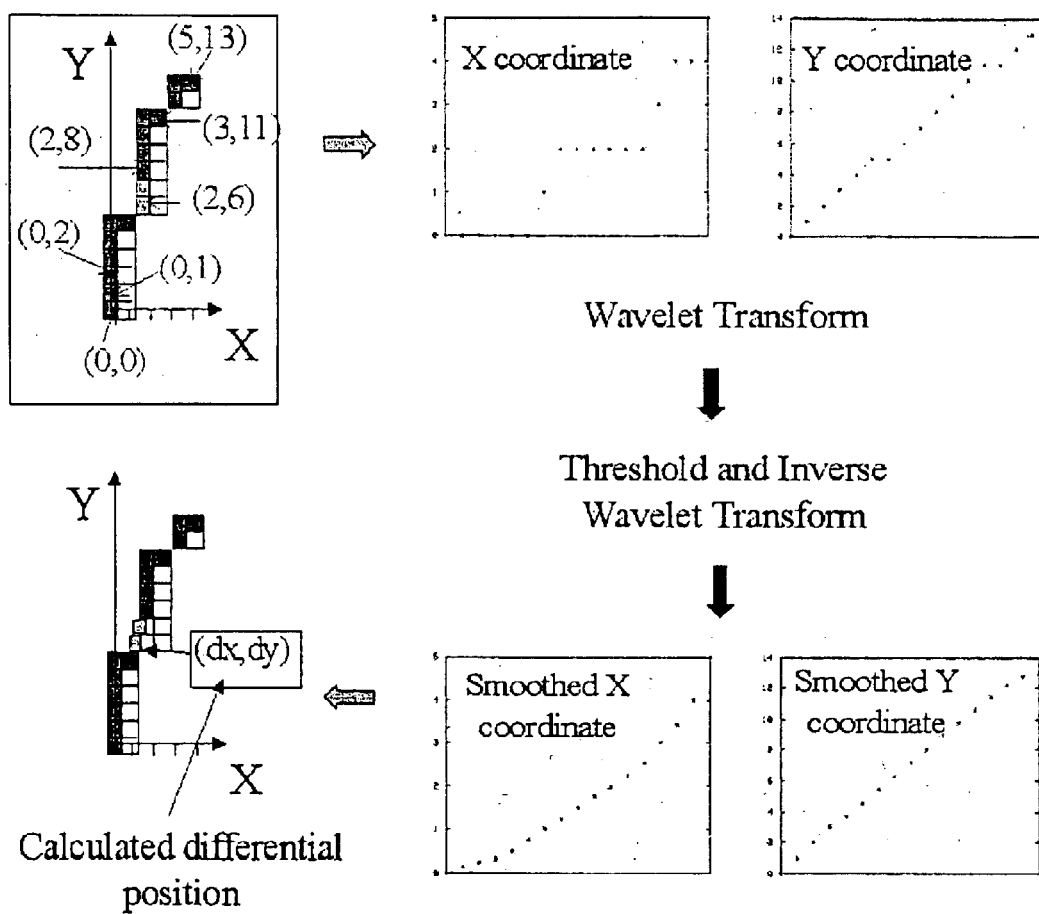
FIG. 5 shows the main steps involved in the boundary smoothing process.

FIG. 5 shows the main steps involved in the boundary segment smoothing process. This portion of the algorithm is preferably carried out off-line and only the results are stored in a LUT. The LUT is accessed using the index constructed from the chain-code of the traced boundary segment at run-time.

In the case of a printer, for example, the smoothing calculations are preferably performed by one skilled in the art, the results stored in a LUT, and the LUT incorporated into the printer before the printer is used/sold. The printer does not need to know how to compute the values in the LUT. Rather, it traces each boundary segment, constructs the chain-code, uses the chain-code to find the location in the LUT corresponding to that boundary segment and uses the results in the LUT to render the final colors, thereby avoiding the smoothing calculations. On-line calculations are those that are done by the printer for each document, whereas off-line calculations are those that are done only once, i.e., only the results of off-line calculations are used on-line. Of course, the LUT which contains the results of the off-line calculations can be updated/upgraded if needed or desired, for example, in a manner similar to BIOS/flash updates for personal computers.

The traced boundary segment shown in FIG. 3 is first up-sampled by a factor of two to form an up-sampled boundary segment. While two is a preferred up-sampling factor, it is not the only factor which can be used. Other larger up-sampling factors can be used, and extending the algorithm to accommodate such larger up-sampling factors is straightforward as will be appreciated by those skilled in the art. As shown in FIG. 5, a first step is to fix an orthogonal (X,Y) coordinate system and decompose the up-sampled boundary segment into its component coordinates. The boundary segment is thus represented as two sequences of points in the X,Y dimensions. These sequences are processed independently to construct their smoothed/de-noised versions. This may be done, for example, by evaluating an over-complete discrete-time wavelet transform of each sequence, thresholding the resulting wavelet coefficients, i.e., by zeroing out the coefficients with absolute values less than a given threshold T, and inverse transforming to obtain the smoothed/de-noised versions. Smoothing/de-noising based on the discrete-time wavelet transform enables "discontinuity friendly" operation which prevents over-smoothing of important features such as corners of text letters. An over-complete discrete wavelet transform refers to several discrete wavelet transforms formed by a given complete discrete wavelet transform and its shifts. For each sequence, smoothing/de-noising is achieved by constructing several intermediate results (one for each discrete wavelet transform), and averaging these intermediate results to obtain the final result. Each intermediate result is obtained by transforming the sequence with the corresponding discrete wavelet transform to obtain the coefficients of the transform, comparing the absolute values of these coefficients to a threshold, setting the coefficients with absolute values less than the threshold to zero, and finally inverse wavelet transforming the possibly modified coefficients.

It is noted that both the transform and its inverse are matrix multiplications on sequences. For a given sequence, the transform generates a new sequence of transform coefficients. This sequence of transform coefficients can be used by the inverse transform to recover the original sequence. The absolute values of the numbers in the coefficient sequence are thresholded and modified. Thus, when inverse transforming is performed, the original sequence is not returned; rather, a smooth version of it is constructed.

Figure 6:
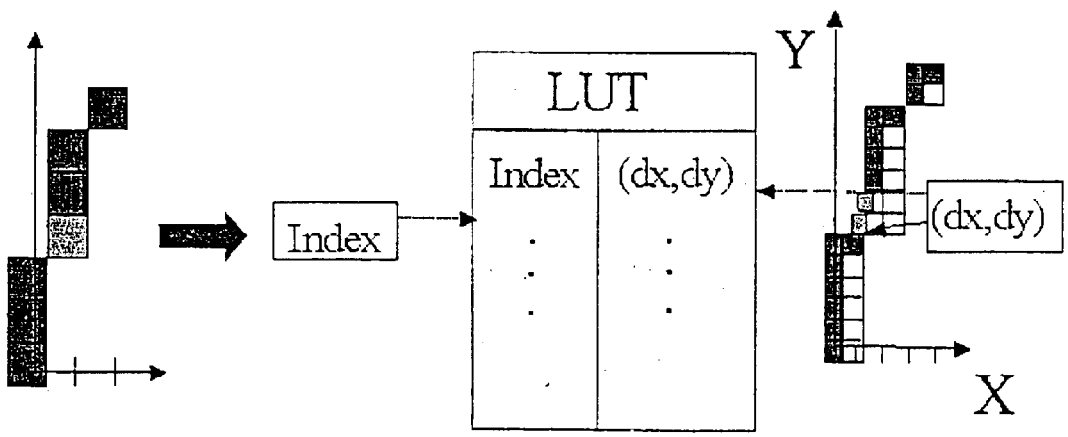
FIG. 6 illustrates construction of the LUT.

The smoothed sequences are combined to form a smooth/de-noised boundary where the "new" coordinates of the up-sampled sub-pixels of the current pixel are determined. A differential pair between these new coordinates and the old coordinates is computed ((dx, dy) in FIG. 5). The computed differential pair is stored in the LUT corresponding to the computed chain-code index for the boundary segment as shown in FIG. 6. Observe that the differentials stored in (dx, dy) are the X and Y coordinate differentials stored for up to four sub-pixels due to the ×2 up-sampling. This is because, after an up-sampling by 2, the original pixel will correspond to four sub-pixels. If the original pixel is a boundary pixel then at least two of the sub-pixels will be boundary pixels in the up-sampled boundary segment. These stored differentials are clamped at the value 1 (for ×2 up-sampling), with the assumption that discretization of the original text/graphics boundary segment introduces at most half pixel errors.

The reason for considering the up-sampled version of the boundary segment is as follows. Suppose the original boundary segment corresponds to a 45° line. If the X and Y coordinates of this line are considered without up-sampling, the result is two sequences which are themselves linear. Since both of these linear sequences are first order polynomials, it is clear that they are smooth in their own right. For example, a wavelet transform evaluated over a signal that is a first order polynomial will produce zero valued wavelet coefficients (except for the trivial case of a Haar wavelet), indicating the high degree of smoothness of the signal. Hence, while the 45° line will suffer from significant aliasing artifacts and require RIT correction, there will be little or no correction affected by the smoothing/de-noising technique employed here. On the other hand, when ×2 up-sampling (or larger factors) are incorporated, the resulting boundary segment is no longer linear or smooth and it will be handled correctly by the RIT algorithm of the present invention. It is important to note that the boundary up-sampling is preferably only done during the computation of the differentials (dx, dy), i.e., during construction of the LUT, and need not be carried out during real time operation.

The index used for the boundary segment is computed from the chain-code of the original boundary segment. Beyond the four-fold rotational symmetry identified in the previous sub-section, the existence of a mirror symmetry results in a two-fold reduction in the maximum number of boundary segments. The index is thus a number between 1 and $$\frac{P^{(2N+1)}}{4 \times 2}.$$

With N=3 and P=4 (i.e., only the directions 0, 1, 2, 3 are searched), there are at most 2048 possible boundary segments.

It should be noted that the algorithm of the present invention does not dictate a particular smoothing/de-noising technique. Wavelet-transform-based de-noising is provided only as an example of a plethora of techniques that can be used to "populate" the LUT.

As already discussed, the RIT algorithm of this invention uses the traced boundary segment to construct an index into a LUT from which the coordinate differentials for the current pixel are determined. For clarity, the subsequent rendering operation is illustrated in terms of the up-sampled boundary segment using box filters. It should be noted, however, that the described operations can be implemented without any actual up-sampling, and more sophisticated filters, such as Gaussian filters, can easily be incorporated if desired. That being said, it should be further noted that, while up-sampling is not necessary, it is desirable since an advantageous feature of the RIT algorithm of the present invention is its ability to render up-sampled output representations, enabling the conversion of, say, a 300 dpi text/graphics representation to 600 dpi.

Figure 7:
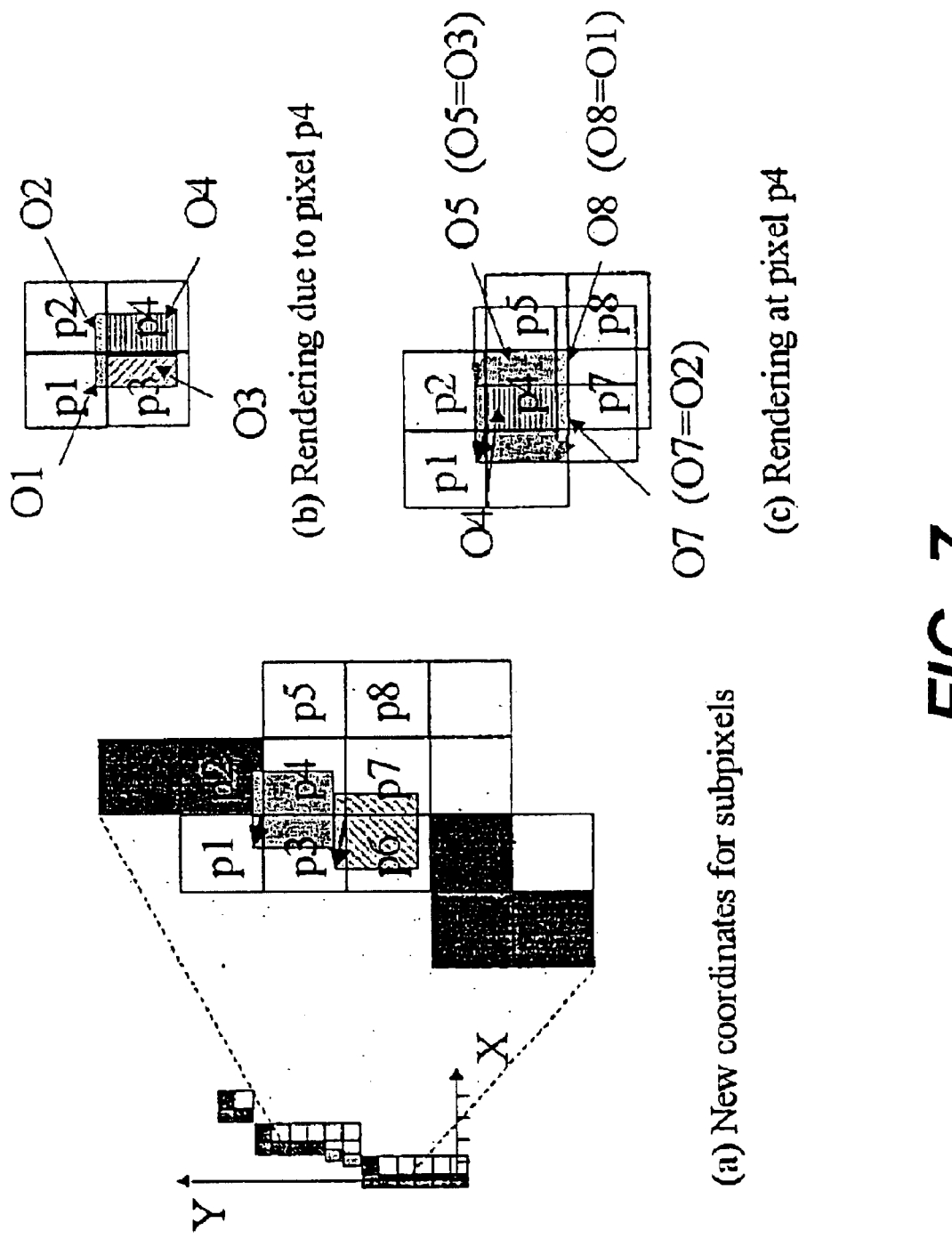
FIGS. 7(a), (b) and (c) illustrate details of the rendering step of the RIT algorithm.

FIG. 7(a) illustrates a magnified portion of the exemplary boundary segment. In this case, the LUT would contain the differentials which determine the new locations of the sub-pixels p4 and p7 of the current pixel. As shown, both of these sub-pixels have "moved" after boundary smoothing. Let us consider the sub-pixel originally located at p4. According to the illustrated differential, this sub-pixel has now moved to a location overlapping pixels p1, p2, p3 and p4. This sub-pixel will therefore modify the color of the sub-pixels at p1, p2, p3 and p4. Let $c_i(p4)$ denote the input color of the sub-pixel at p4 with the understanding that the input color of a sub-pixel is the same as the color of its parent pixel in the input representation. In the rendering step, the algorithm keeps track of the output representation color $c_o$ ( . . . ) as well as the percentage occupancy a( . . . ) of each sub-pixel, where a( . . . )=0→0% and a( . . . )=1→100%.

The rendering step begins by coloring all pixels in the output representation with the color 0 and zeroing out the percentage occupancies. As illustrated in FIG. 7(b), the sub-pixel that was originally at p4 now occupies percentages O1, O2, O3, and O4 of the sub-pixels p1, p2, p3, and p4. Thus, the rendering due to the sub-pixel that was at p4 modifies the sub-pixel p1 variable by:

$$c_o(p1) = c_o(p1) + O1 \times c_i(p4) \quad (1)$$

$$a(p1) = a(p1) + O1 \quad (2)$$

and similarly for p2 and p3. In order to determine the new color at p4 a locally rigid motion model is employed.

Continuing with the rubber band analogy introduced earlier, it can be seen that the rendering for sub-pixel p4 in the output representation is not only influenced by $c_i$ (p4) but also by $c_i$ (p5), $c_i$ (p7), and $c_i$ (p8) i.e., $c_o$(p4) will also be influenced by the colors of all the pixels neighboring p4 which will occupy a portion of the pixel p4 with a locally rigid motion assumption.

The variables at p4 are thus updated as:

$$c_o(p4)=c_o(p4)+O4 \times c_i(p4)+O5 \times c_i(p5)+O7 \times c_i(p7)+O8 \quad (3)$$

$$a(p4)=a(p4)+1 \quad (4)$$

which corresponds to a locally rigid motion. This ensures that no holes are left at the locations of moving pixels. Observe that in FIG. 7(c), due to the assumed rigid motion, O5=O3, O8=O1, and O7=O2.

After all boundary sub-pixels are rendered to their respective new locations in this fashion, the output representation is made up of sub-pixels with occupancy values that are greater than 100% and that are less than or equal to 100%. The final color at sub-pixels with occupancy greater than 100% is determined by normalizing by the corresponding percentage, i.e., the color is divided by 2 if the occupancy is 2, etc. The final color at sub-pixels with occupancy less than or equal to 100% is determined by:

$$c_o(p)=c_o(p)+(1-a(p)) \times c_i(p) \quad (5)$$

where p denotes the location of such a sub-pixel. This ensures that after resolution improvement text and graphics pixels blend smoothly into the background.

The rendering process has been illustrated, by way of example, using up-sampled boundary segments and "box" occupancy filters. As previously noted, however, the described rendering operations can easily be accomplished without any actual up-sampling. Furthermore, more sophisticated filters, such as Gaussian filters, can be used to determine occupancy and final colors with different upsampling rates. Note also that non-integer up-sampling rates can be accomplished by simply adapting the algorithm to up-sample to an integer rate that is higher than the desired rate, followed by using occupancy or other filters to down-sample to the desired rate. Thus, the algorithm of the present invention can be used to do resolution improvement by a general factor that is not necessarily two or even an integer. Observe also that while the storing of differentials in the LUT as described is advantageous when the algorithm is used in applications involving up-sampling by a factor of two, say 300 dpi to 600 dpi conversion, alternatively one can store general occupancy information in the LUT that is directly utilized in the rendering step. General occupancy information can be in terms of occupancies for the current pixel and its immediate neighbors. The occupancy information can be adjusted to incorporate the desired up-sampling (if any) and more sophisticated occupancy filters. All such alternatives and variations would be straightforward for one skilled in the art to implement based on the foregoing description.

C. Implementations and Applications

Figure 8:
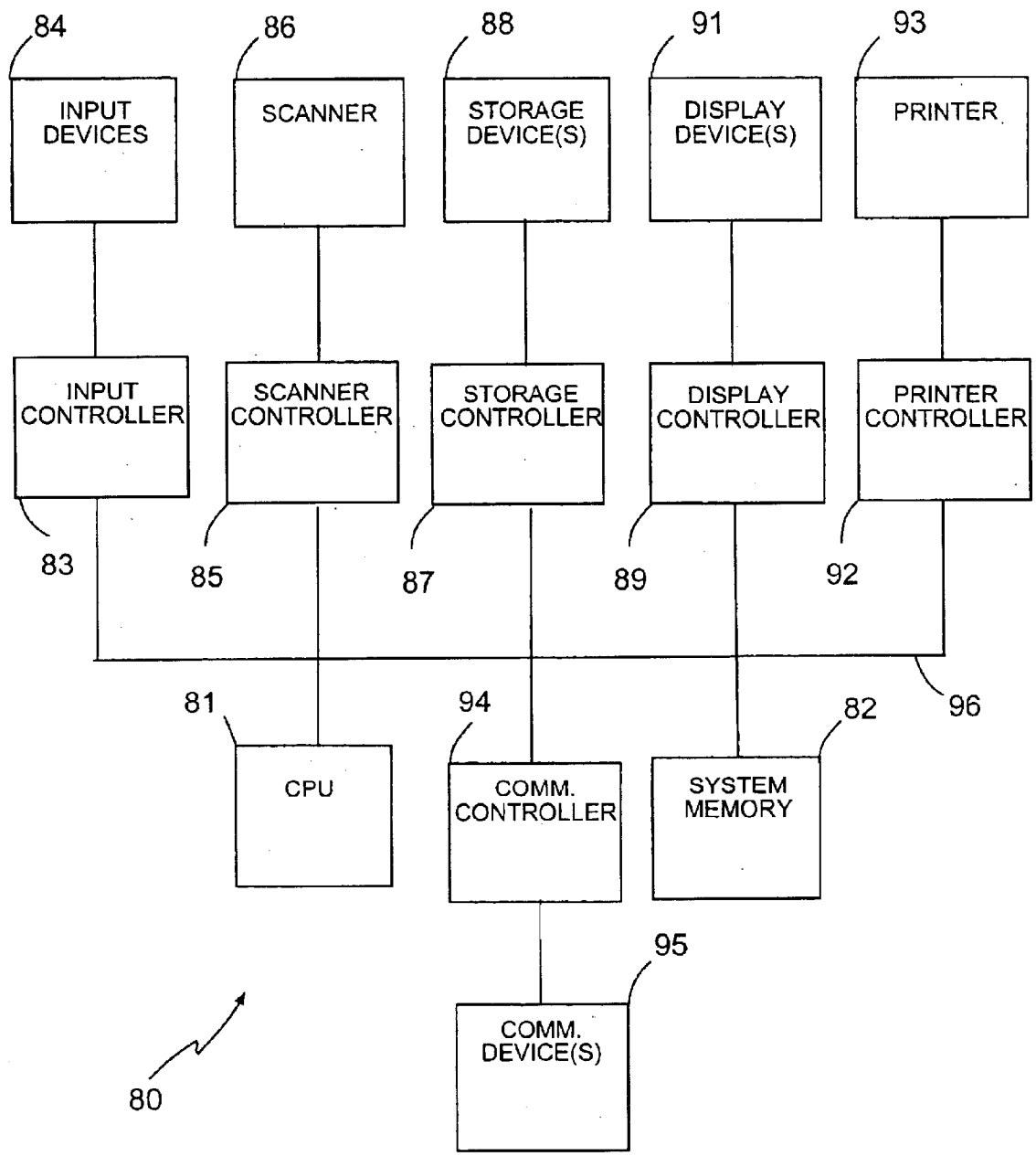
FIG. 8 is a block diagram illustrating an exemplary system which may be used to implement the techniques of the present invention.

FIG. 8 illustrates an exemplary system 80 which may be used to implement the techniques of the present invention. As illustrated in FIG. 8, the system includes a central processing unit (CPU) 81 that provides computing resources and controls the computer. CPU 81 may be implemented with a microprocessor or the like, and may also include a graphics processor and/or a floating point coprocessor for mathematical computations. System 80 further includes system memory 82 which may be in the form of random-access memory (RAM) and read-only memory (ROM).

A number of controllers and peripheral devices are also provided, as shown in FIG. 8. Input controller 83 represents an interface to various input devices 84, such as a keyboard, mouse or stylus. There is also a controller 85 which communicates with a scanner 86 or equivalent device for digitizing documents including images or representations to be processed in accordance with the invention. A storage controller 87 interfaces with one or more storage devices 88 each of which includes a storage medium such as magnetic tape or disk, or an optical medium that may be used to record programs of instructions for operating systems, utilities and applications which may include embodiments of programs that implement various aspects of the present invention. Storage device(s) 88 may also be used to store processed or data to be processed in accordance with the invention. A display controller 89 provides an interface to a display device 91 which may be a cathode ray tube (CRT) or thin film transistor (TFT) display. A printer controller 92 is also provided for communicating with a printer 93 for printing documents including images or representations processed in accordance with the invention. A communications controller 94 interfaces with one or more communication devices 95 which enables system 80 to connect to remote devices through any of a variety of networks including the Internet, a local area network (LAN), a wide area network (WAN), or through any suitable electromagnetic carrier signals including infrared signals.

In the illustrated system, all major system components connect to bus 96 which may represent more than one physical bus. However, depending on the particular application of the invention, various system components may or may not be in physical proximity to one another. For example, the input data and/or the output data may be remotely transmitted from one physical location to another. Also, programs that implement various aspects of this invention may be accessed from a remote location (e.g., a server) over a network. Such data and/or programs may be conveyed through any of a variety of machine-readable medium including magnetic tape or disk or optical disc, network signals, or any other suitable electromagnetic carrier signals including infrared signals.

While the present invention may be conveniently implemented with software, a hardware implementation or combined hardware/software implementation is also possible. A hardware implementation may be realized, for example, using ASIC(s), digital signal processing circuitry, or the like. As such, the term device-readable medium further includes hardware having a program of instructions hardwired thereon. With these implementation alternatives in mind, it is to be understood that the figures and accompanying description provide the functional information one skilled in the art would require to write program code (i.e., software) or to fabricate circuits (i.e., hardware) to perform the processing required.

An important application for the present application is the ubiquitous printing operations where text and graphics generated on a computer or personal digital assistant (PDA) are printed on high resolution laser printers. In the former case, the difference between the rendering resolution of the computer and the print resolution can be small (for scalable text and graphics) or large (for bitmap text and graphics). In the latter case, because of limitations of the PDA, the resolution difference is large. While the present invention will have a much more pronounced impact for large resolution differences, it will also make a important contribution for small resolution differences, especially when text and graphics with small features are present.

As the foregoing demonstrates, the present invention provides a fast and efficient LUT-based algorithm, which may be implemented with software or hardware, for improving text and graphics resolution for high quality rendering on high resolution devices. The algorithm is quite flexible, enabling applications such as the enhancement and printing of low resolution or hand-drawn text and/or graphics. The algorithm is not constrained by the number of color planes, etc. in the input representation. Furthermore, the algorithm can be easily tailored to output in a variety of display formats by suitably changing the rendering step. The algorithm can be deployed as an integral part of the printing engine, yielding very high resolution pulse width modulated outputs from given input representations. The flexibility provided by the LUT-based operation can further be exploited by incorporating even more sophisticated signal processing algorithms in the LUT design process. The look-up process is direct, and the algorithm does not have to do computationally expensive searches, etc. in order to find the relevant locations in the LUT. Extensions such as selective smoothing/de-noising based on input boundary segment classification are relatively easy to implement since the LUT is computed off-line.

It should be noted that while a LUT-based resolution improvement algorithm is clearly preferred, the algorithm could be run without using a LUT. That is, by actually doing the smoothing computations for each boundary segment during on-line operation. This may be the case if one wants a particular document to look as good as possible and does not want to lose performance based on LUT size limitations. In such a case, N could be made much larger than it could if a LUT was being used. Of course, the overall process of tracing, smoothing and rendering will take considerably longer, since the smoothing computations are being done during run-time.

While the invention has been described in conjunction with several specific embodiments, further alternatives, modifications, variations and applications will be apparent to those skilled in the art in light of the foregoing description. Thus, the invention described herein is intended to embrace all such alternatives, modifications, variations and applications as may fall within the spirit and scope of the appended claims.

What is claimed is:

1. A method for improving resolution of a digital representation having a plurality of text or graphics pixels, comprising the steps of:
   identifying a text or graphics pixel on a boundary of a text or graphics object of the digital representation; and
   for each text or graphics pixel identified as on the boundary
      tracing a group of pixels, including the initial boundary-identified pixel, that constitute a local boundary segment and constructing an identifier indicative of the number and relative locations of the pixels of that local boundary segment, the tracing comprising searching for and identifying each new pixel in the group with respect to a background pixel near the initial boundary-identified pixel, wherein orientation and order of the searching is with respect to the background pixel during the entire tracing step;
      parameterizing and smoothing that local boundary segment, resulting in a new local boundary segment, without consideration of non-boundary segment data, by computing instructions for parameterizing and smoothing that local boundary segment; and
      rendering the parameterized and smoothed boundary segment to increase the resolution of the text or graphics object.

2. The method of claim 1, wherein the instructions are pre-computed, stored in a look-up table, indexed by the corresponding identifier, and directly accessed during the parameterizing and smoothing of that local boundary segment.

3. The method of claim 2, wherein the stored instructions on parameterizing and smoothing comprise a differential stored at a location in the pre-computed look-up table indexed by the corresponding identifier, the differential representing a difference between the location of at least one pixel in the new local boundary segment and the location of that pixel in the corresponding un-parameterized and un-smoothed local boundary segment.

4. The method of claim 2, wherein the stored instructions on parameterizing and smoothing comprise general occupancy information stored at a location in the pre-computed look-up table indexed by the corresponding identifier, the general occupancy information representing a difference between the location of the new local boundary segment and the location of the corresponding un-parameterized and un-smoothed local boundary segment.

5. The method of claim 1, wherein the tracing step comprises identifying first and second contiguous sub-groups of pixels, each starting with the initial pixel and extending in first and second directions respectively relative to the propagated background neighbor pixel and, if available, a just-identified pixel in that sub-group to construct the identifier.

6. The method of claim 1, wherein the tracing step comprises tracing N pixels in a first direction and N pixels in a second direction to construct the identifier based on a pre-determined set of rules used in the tracing step.

7. The method of claim 1, wherein the identifying step comprises identifying each text and graphics pixel on a boundary of a text or graphics object of the digital representation and performing the tracing, parameterizing and smoothing, and rendering for each boundary-identified pixel.

8. An apparatus for improving resolution of a digital representation having a plurality of text or graphics pixels, the apparatus comprising:
   means for identifying a text or graphics pixel on a boundary of a text or graphics object of the digital representation; and
   means for tracing a group of pixels, including an initial boundary-identified pixel, that constitute a local boundary segment and constructing an identifier indicative of the number and relative locations of the pixels of that local boundary segment, the tracing comprising searching for and identifying each new pixel in the group with respect to a background pixel near the initial boundary-identified pixel, wherein orientation and order of the searching is with respect to the background pixel during the entire tracing operation;
   means for parameterizing and smoothing that local boundary segment to generate a new local boundary segment, without consideration of non-boundary segment data, by computing instructions for parameterizing and smoothing that local boundary segment; and
   means for rendering the parameterized and smoothed boundary segment to increase the resolution of the text or graphics object.

9. The apparatus of claim 8, wherein the instructions are pre-computed, stored in a look-up table, indexed by the corresponding identifier, and directly accessed during the parameterizing and smoothing of that local boundary segment.

10. The apparatus of claim 9, wherein the stored instructions on parameterizing and smoothing comprise a differential stored at a location in the pre-computed look-up table indexed by the corresponding identifier, the differential representing a difference between the location of at least one pixel in the new local boundary segment and the location of that pixel in the corresponding un-parameterized and un-smoothed local boundary segment.

11. The apparatus of claim 9, wherein the stored instructions on parameterizing and smoothing comprise general occupancy information stored at a location in the pre-computed look-up table indexed by the corresponding identifier, the general occupancy information representing a difference between the location of the new local boundary segment and the location of the corresponding un-parameterized and un-smoothed local boundary segment.

12. The apparatus of claim 8, wherein the tracing means is configured to identify first and second contiguous sub-groups of pixels, each starting with the initial pixel and extending in first and second directions respectively relative to the propagated background neighbor pixel and, if available, a just-identified pixel in that sub-group to construct the identifier.

13. The apparatus of claim 8, wherein the tracing means is configured to trace N pixels in a first direction and N pixels in a second direction to construct the identifier.

14. The apparatus of claim 8, wherein the identifying means is configured to identify each text and graphics pixel on a boundary of a text or graphics object of the digital representation, and wherein the tracing, parameterizing and smoothing, and rendering means are each configured to operate on each boundary-identified pixel.

15. A machine-readable medium having a program of instructions for directing a machine to improve resolution of a digital representation having a plurality of text or graphics pixels, the program of instructions comprising:

instructions for identifying a text or graphics pixel on a boundary of a text or graphics object of the digital representation; and for each text or graphics pixel identified as on the boundary instructions for tracing a group of pixels, including the initial boundary-identified pixel, that constitute a local boundary segment and constructing an identifier indicative of the number and relative locations of the pixels of that local boundary segment, the tracing instructions comprising instructions for searching for and identifying each new pixel in the group with respect to a background pixel near the initial boundary-identified pixel, such that orientation and order of the searching is with respect to the background pixel during the entire tracing operation;

instructions for parameterizing and smoothing that local boundary segment, resulting in a new local boundary segment, without consideration of non-boundary segment data, by computing directions for parameterizing and smoothing that local boundary segment; and instructions for rendering the parameterized and smoothed boundary segment to increase the resolution of the text or graphics object.

16. The machine-readable medium of claim 15, wherein the directions are pre-computed, stored in a look-up table, indexed by the corresponding identifier, and directly accessed during the parameterizing and smoothing of that local boundary segment.

17. The machine-readable medium of claim 16, wherein the stored directions on parameterizing and smoothing comprise a differential stored at a location in the pre-computed look-up table indexed by the corresponding identifier, the differential representing a difference between the location of at least one pixel in the new local boundary segment and the location of that pixel in the corresponding un-parameterized and un-smoothed local boundary segment.

18. The machine-readable medium of claim 16, wherein the stored directions on parameterizing and smoothing comprise general occupancy information stored at a location in the pre-computed look-up table indexed by the corresponding identifier, the general occupancy information representing a difference between the location of the new local boundary segment and the location of the corresponding un-parameterized and un-smoothed local boundary segment.

19. The machine-readable medium of claim 15, wherein the tracing instructions comprises identifying first and second contiguous sub-groups of pixels, each starting with the initial pixel and extending in first and second directions respectively relative to the propagated background neighbor pixel and, if available, a just-identified pixel in that sub-group to construct the identifier.

20. The machine-readable medium of claim 15, wherein the tracing instructions comprises instructions for tracing N pixels in a first direction and N pixels in a second direction to construct the identifier based on a pre-determined set of rules used in the tracing.

21. The machine-readable medium of claim 15, wherein the identifying instructions comprises identifying each text and graphics pixel on a boundary of a text or graphics object of the digital representation, and performing the tracing, parameterizing and smoothing, and rendering for each boundary-identified pixel.

* * * * *